United States Patent
Autor et al.

(10) Patent No.: US 12,032,517 B2
(45) Date of Patent: Jul. 9, 2024

(54) FILE SYSTEM AREAS IN FIELD REPLACEABLE UNIT STORAGE DEVICES

(71) Applicant: HEWLETT PACKARD ENTERPRISE DEVELOPMENT LP, Houston, TX (US)

(72) Inventors: Jeffrey S. Autor, Cypress, TX (US); Jeffrey R. Hilland, Lago Vista, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/049,896

(22) Filed: Oct. 26, 2022

(65) Prior Publication Data

US 2024/0143547 A1    May 2, 2024

(51) Int. Cl.
*G06F 16/00*    (2019.01)
*G06F 16/13*    (2019.01)
*G06F 16/182*   (2019.01)

(52) U.S. Cl.
CPC .......... *G06F 16/134* (2019.01); *G06F 16/183* (2019.01)

(58) Field of Classification Search
CPC ............................. G06F 16/134; G06F 16/183
See application file for complete search history.

(56) References Cited

U.S. PATENT DOCUMENTS

| 9,311,208 | B2 | 4/2016 | Messer |
| 9,794,330 | B2 | 10/2017 | Yeh et al. |
| 2003/0216881 | A1* | 11/2003 | Weiss ..................... G06Q 30/02 702/130 |
| 2003/0217153 | A1* | 11/2003 | Rao ......................... G06Q 30/02 709/226 |
| 2008/0250402 | A1* | 10/2008 | Brinkmeyer ............. G06F 8/656 717/168 |
| 2014/0032641 | A1* | 1/2014 | Du .......................... G06F 9/455 709/203 |

(Continued)

FOREIGN PATENT DOCUMENTS

CN    110427371 A    11/2019

OTHER PUBLICATIONS

DMTF, "FRU Data Model / Schema", Jun. 2022, 11 pages.

(Continued)

*Primary Examiner* — Khanh B Pham
(74) *Attorney, Agent, or Firm* — Trop, Pruner & Hu, P.C.

(57) ABSTRACT

In some examples, a field replaceable unit (FRU) storage device includes a storage medium storing a plurality of information areas and a common header for the plurality of information areas. The common header contains an indicator that when set to a first value indicates presence in the FRU storage device of first electronic component data according to an extended format that is different from a first format governing storage of second electronic component data in the FRU storage device relating to an electronic component in an FRU. The common header contains a field set to location information referring to a storage location of a file system area on the FRU storage device when the indicator is set to the first value, the file system area containing the first electronic component data according to the extended format and that relates to an electronic component in the FRU, wherein the file system area is accessible by a file system using information in the file system area.

20 Claims, 5 Drawing Sheets

(56) References Cited

U.S. PATENT DOCUMENTS

2015/0046761 A1* 2/2015 Messer .................. G06F 11/00
 714/710
2019/0197261 A1 6/2019 Yu et al.

OTHER PUBLICATIONS

Hilland, Jeff, "Redfish & RDE For Storage", DMTF, 2018, 33 pages.
IPMI "Platform Management FRU Information Storage Definition v1.0", Feb. 28, 2013, 36 Pgs.
IPMI, "Platform Management FRU Information Storage Definition v1.0", Document Revision 1.3, Mar. 24, 2015, 34 pages.
Xilinx, "Alveo Data Center Accelerator Cards FRU Data Specification", Jan. 16, 2020, 27 Pages.

* cited by examiner

FILE SYSTEM AREAS IN FIELD REPLACEABLE UNIT STORAGE DEVICES

BACKGROUND

A field replaceable unit (FRU) refers to a part or assembly that can be removed from an electronic equipment and replaced with another part or assembly. Examples of FRUs include any or some combination of the following: a printed circuit board, an electronic module, an electronic chip, a power supply, an electronic device, and so forth. FRUs can be installed in larger systems.

BRIEF DESCRIPTION OF THE DRAWINGS

Some implementations of the present disclosure are described with respect to the following figures.

Figure 1:
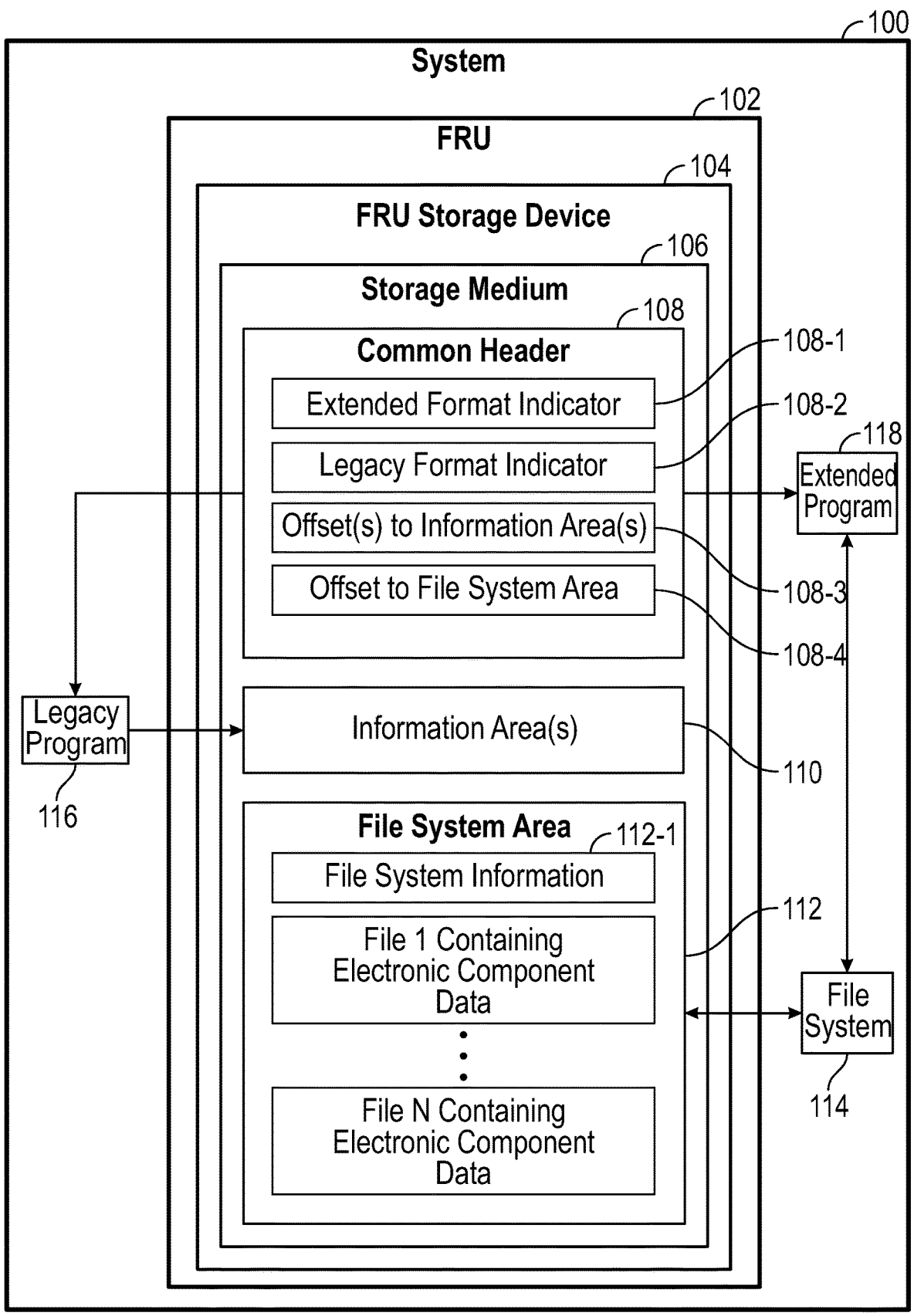
FIGS. 1 and 2 are block diagrams of systems including field replaceable unit (FRU) storage devices, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

A field replaceable unit (FRU) can refer to any or some combination of the following: a printed circuit board (PCB) on which can be mounted electronic components, an electronic module (e.g., a processor module including a processor or multiple processors, a memory module including a memory or multiple memories, an input/output (I/O) module including an I/O component or multiple I/O components, etc.), an electronic chip (e.g., a processor chip, a memory chip, an I/O chip, etc.), a power supply, an electronic device such as a computer (e.g., a server computer, a desktop computer, a tablet computer, a notebook computer, an Internet-of-Things (IoT) device, etc.), and so forth. An FRU can be included in a larger system, such as a computer system (e.g., a computer, a server assembly of computers such as a server rack), a storage system, a communication system, a vehicle, a household appliance, a power system, etc.).

An FRU can include a storage device (which can be referred to as an "FRU storage device" or "FRU information device") that stores electronic component data (also referred to as "FRU information") regarding electronic component(s) of the FRU. For example, if an FRU includes a PCB on which are mounted various electronic components (e.g., a processor, a memory device, an I/O device, etc.), then the electronic component data can relate to the various electronic components of the PCB. Note that an FRU can include a single electronic component or multiple electronic components.

The FRU storage device stores electronic component data relating to electronic component(s) of the FRU so that an entity (e.g., a user, a program, or a machine) is able to determine what electronic component(s) is (are) part of the FRU. For example, electronic component data that can be stored in an FRU storage device includes any or some combination of the following: a part number of an electronic component (that identifies a design or model of the electronic component), a serial number of an electronic component (that identifies the specific electronic component), product name information that includes a name of an electronic component, version information regarding a version of an electronic component, configuration information specifying a configuration of an electronic component, chassis information that relates to a chassis or enclosure for an electronic component, manufacturer information that indicates a manufacturer of an electronic component, manufacture date/time information that indicates a date and/or time at which an electronic component was made, or any other type of information that relates to an electronic component.

Although the foregoing provides various examples of electronic component data, in further examples, additional or alternative electronic component data can be provided.

In some examples, formatting of electronic component data stored in an FRU storage device can be according to an Intelligent Platform Management Interface (IPMI) Platform Management FRU Information Storage Definition protocol, such as defined by the IPMI Platform Management FRU Information Storage Definition Specification. In the ensuing discussion, the IPMI Platform Management FRU Information Storage Definition Specification is referred to as the "IPMI FRU Specification."

IPMI refers to a collection of computer interface specifications that provide for management and monitoring capabilities, such as by use of an out-of-band management interface to perform monitoring of operations of a system. An "out-of-band management" interface can refer to a communication interface that is separate from a network interface of a system that is used by the system to perform data communications with other endpoints.

Although reference is made to "IPMI" in some examples, it is noted that in other examples, FRU storage devices can be used in other contexts. Also, formatting of electronic component data in an FRU storage device can be according to different protocols, whether standardized, open source, or proprietary.

Electronic component data stored in an FRU storage device may be encoded into specific formats, such as formats according to the IPMI FRU Specification and in some cases proprietary formats. The encoding of the electronic component data may lead to data errors and lack of flexibility. For example, during manufacture of an FRU, as electronic component data is stored into an FRU storage device of the FRU, any encoding errors of the electronic component data can result in corrupted data being stored in the FRU storage device. Similarly, when accessing electronic component data in an FRU storage device, the presence of the encoded data can reduce flexibility in what entities are able to access the electronic component data. Moreover, electronic component data stored in an FRU storage device may be organized in a way that is not expected by an entity attempting to access the electronic component data, which can result in errors when the electronic component data is retrieved.

As electronic components continue to evolve, the quantity and types of information relating to electronic components to be stored in an FRU storage device may increase. Pre-existing formats employed for electronic component data stored in FRU storage devices may not easily be extended to support the increasing quantity and types of electronic component data that are to be stored in FRU storage devices.

In accordance with some implementations of the present disclosure, an FRU storage device can be configured to support storage of electronic component data for an FRU using any of various extended formats, including formats that are widely supported (e.g., formats defined by standards, open-source formats, etc.).

An "extended format" can refer to a format of electronic component data that is in addition to format(s) consistent with a specific protocol (e.g., the IPMI FRU Specification) governing storage of electronic component data in an FRU storage device. A format is consistent with a given protocol if the format is defined by the given protocol or allowed by the given protocol. Stated differently, the extended format is outside of the given protocol.

Although an extended format of electronic component data may not be consistent with a given version of a protocol (i.e., the extended format is outside of the given version of the protocol), note that the extended format may be consistent with later version(s) of the protocol governing storage of electronic component data in an FRU storage device.

Examples of extended formats can include any or some combination of the following: binary data, JavaScript Object Notation (JSON) data, Redfish Device Enablement (RDE)-defined binary encoded JSON data, raw text data, and so forth. Although reference is made to examples of extended formats of electronic component data that can be stored in an FRU storage device, additional or alternative extended formats may be employed in further examples.

Electronic component data (or equivalently, FRU information) is stored in an FRU storage device of an FRU during building (e.g., manufacture or assembly) of the FRU. The electronic component data stored in the FRU storage device can be machine-readable by a program executed in a machine or by hardware of a machine.

In some examples, an FRU storage device can be implemented as an electrically erasable and programmable read-only memory (EEPROM) device. More generally, an FRU storage device can be implemented using any type of a persistent memory device, such as a flash memory device, a battery-backed dynamic random access memory (DRAM) device or static random access memory (SRAM) device, and so forth. A "persistent" memory device refers to a memory device that is able to maintain data stored in the memory device even when power is removed from a larger assembly that the memory device is part of.

In some examples, an FRU storage device includes a storage medium that stores multiple information areas that contain respective electronic component data. The storage medium also stores a common header for the multiple information areas. In accordance with some implementations of the present disclosure, the common header contains an indicator that when set to a first value indicates presence in the FRU storage device of first electronic component data according to an extended format that is different from a given format (consistent with a version of a protocol governing FRU information storage) of further electronic component data in the FRU storage device relating to an electronic component in a system. The common header further includes a field set to location information referring to a storage location of a file system area on the FRU storage device when the indicator is set to the first value. The file system area contains the first electronic component data according to the extended format, and the file system area is accessible by a file system using information in the file system area.

FIG. 1 is a block diagram of an example system 100 that includes an FRU 102. Examples of the system 100 can include any or some combination of the following: a computer system, a storage system, a communication system, a vehicle, a household appliance, a power system, or any other type of electronic system.

Although just one FRU 102 is shown in FIG. 1, the system 100 in further examples may include multiple FRUs.

The FRU 102 includes a number of electronic components (not shown in FIG. 1) and an FRU storage device 104. As used here, a "number" of items (such as electronic components) may include a single item or multiple items.

The FRU storage device 104 includes a storage medium 106 that stores electronic component data for the number of electronic components of the FRU 102. In some examples, the storage medium 106 can include an array of memory cells, such as memory cells of an EEPROM, a flash memory device, or any other type of persistent memory device.

The storage medium 106 stores a common header 108, a collection of information areas 110 (which can include a single information area 110 or multiple information areas 110), and a file system area 112 according to some examples of the present disclosure. The collection of information areas 110 can be used to store electronic component data for electronic component(s) of the FRU 102.

A "common header" refers to a header that contains information for multiple information areas stored in the storage medium 106. A common header for multiple information areas is different from individual headers that are individually associated with corresponding information areas. In the example of FIG. 1, the multiple information areas associated with the common header 108 includes the collection of information areas 110 and the file system area 112 (note that the file system area 112 is considered an information area that contains electronic component data).

A "file system area" can refer to an information area in the storage medium 106 that is to be accessed using a file system 114 of the system 100. A "file system" can refer to a mechanism (implemented with machine-readable instructions, for example) that is used to control how data is stored and retrieved from storage devices. The file system 114 can access files that store data. In some examples, the file system 114 includes a File Allocation Table (FAT) file system. In other examples, other types of file systems can be employed.

In some examples, the collection of information areas 110 can store electronic component data according to format(s) consistent with a specific version of the IPMI FRU Specification, such as Revision 1.3 of the IPMI FRU Specification (or a different version of the IPMI FRU Specification). The file system area 112 can store electronic component data according to extended format(s) that is extended from the specific version of the IPMI FRU Specification. Note that the extended format(s) of electronic component data in the file system area 112 may be consistent with a later version of the IPMI FRU Specification.

Although examples refer to the IPMI FRU Specification, in other examples, electronic component data may be governed by other protocols.

In some examples of the present disclosure, the common header 108 can include the following information: an extended format indicator 108-1, a legacy format indicator 108-2, a number of offsets 108-3 to the number of information areas 110, and an offset 108-4 to the file system area 112. In further examples, there may be multiple file system areas 112, so that the common header 108 can include multiple offsets 108-4 to the multiple file system areas.

An "offset" can refer to storage location information that identifies where in the storage medium 106 a corresponding information area (110 or 112) is present. For example, the storage location information can include a starting address of an information area in a memory device.

In accordance with some examples of the present disclosure, the file system area 112 contains file system information 112-1, which is used by the file system 114 to access further data in the file system area 112. In examples where the file system 114 is a FAT file system, the file system information 112-1 can contain an index table, referred to as a File Allocation Table (FAT), to identify chains of data storage areas associated with each file in the file system area 112. A data storage area can be referred to as a "cluster" according to the FAT the system. A cluster is a contiguous area of storage in the storage medium 106.

The FAT is allocated at the time of formatting of the file system area 112 in the storage medium 106. The FAT includes a linked list of entries for dusters (data storage areas) that make up a file. Each entry of the FAT contains either the number of the next duster in the file, or a marker indicating the end of the file. The file system 114 can traverse the FAT to look up the duster number of each successive part of a file in a chain of clusters unto the end of the file is reached.

Although reference is made to a FAT file system and use of a FAT in the file system information 112-1, in other examples, other file systems can employ different file system information 112-1 that defines how files are arranged (e.g.; as files and directories) in the file system area 112.

As shown in FIG. 1, the file system information 112-1 can be used by the file system 114 to access respective files that contain corresponding electronic component data in the file system area 112. In examples according to FIG. 1, file system area 112 includes file 1 to file N. In some examples, N is greater than 1 such that the file system area 112 contains multiple files including electronic component data for respective electronic components. In other examples, N is equal to 1 (i.e., the file system area in such examples would include just one file containing electronic component data). In further examples, note that plural files in the file system area 112 can include electronic component data for one electronic component.

In some examples, the file system 114 can be part of an operating system (OS) of the system 100. In other examples, the file system 114 can be separate from the OS.

FIG. 1 also depicts a legacy program 116 and an extended program 118. As used here, a "legacy" program can refer to a program that is able to access FRU information according to a specific version of a protocol (e.g., the IPMI FRU Specification), whereas the "extended" program 118 is able to access electronic component data according to an extended format, including the electronic component data in the file system area 112. A "program" contains machine-readable instructions executable on processor(s) (not shown) in the system 100 to perform respective tasks.

Although examples according to FIG. 1 depict both the legacy program 116 and the extended program 118, in other examples, a single program can be used to access electronic component data in both the number of information areas 110 and the file system area 112.

The legacy program 116 is able to access electronic component data in the number of information areas 110, by using the number of offsets 108-3 in the common header 108. The legacy program 116 accesses an offset 108-3 to determine a storage location (e.g., a starting address) in the storage medium 106 of a respective information area 110, and uses the determined storage location to retrieve electronic component data from the respective information area 110.

The extended program 118 is able to access the file system area 112 using the offset 108-4 to the file system area 112. The extended program 118 accesses the offset 108-4 to determine a storage location (e.g., a starting address) in the storage medium 106 of the file system area 112, and uses the determined storage location to retrieve electronic component data from the file system area 112. The extended program 118 accesses files in the file system area 112 using the file system 114. For example, the extended program 118 can issue a request to the file system 114 to read a particular file from the file system area. The file system 114 responds to the request by accessing the particular file using the file system information 112-1 in the file system area 112, and returns the particular file to the extended program 118.

The extended format indicator 108-1 can be set to any of multiple values. If the extended format indicator 108-1 is set to a first value, that indicates presence of the file system area 112 in the FRU storage device 104. On the other hand, if the extended format indicator 108-1 is set to a second value that is different from the first value, then that does not indicate that the file system area 112 is present in the FRU storage device 104. In some examples, if the extended format indicator 108-1 is set to the second value, then whether or not the file system area 112 is present in the FRU storage device 104 may be indeterminate, i.e., the file system area 112 may or may not be present in the FRU storage device 104. Ire other examples, the extended format indicator 108-1 being set to the second value can indicate that the file system area 112 is not present (in other words, the storage medium 106 stores just the number of information areas 110 but not the file system area 112).

In some examples, the extended format indicator 108-1 can be implemented using multiple bits of a field in the common header 108. In other examples, the extended format indicator 108-1 can be implemented using a single bit of a field in the common header 108.

The legacy format indicator 108-2 can be set to any of various values that correspond to different versions of a protocol governing storage of electronic component data in the number of information areas 110. For example, a first value of the legacy format indicator 108-2 can indicate a first version of the protocol governing storage of electronic component data in the number of information areas 110, a different second value of the legacy format indicator 108-2 can indicate a second version of the protocol governing storage of electronic component data in the number of information areas 110, and so forth.

In some examples, the legacy format indicator 108-2 can be implemented using multiple bits of a field in the common header 108. In other examples, the legacy format indicator 108-2 can be implemented using a single bit of a field in the common header 108.

Table 1 below depicts an example common header (an example of 108 in FIG. 1) that is modified from a common header defined by a particular version of the IPMI FRU Specification (e.g., Version 1.3). The example common header includes 9 fields, each 1 byte in length as indicated by the "Field Length" of each field in Table 1. Although Table 1 shows an example of a modified common header, in other examples, modified common headers with different fields and/or different field lengths may be used.

In some examples, the common header is the starting point for accessing FRU information in an FRU storage device. For example, the common header can start at offset 00h (or another beginning offset) in the FRU storage device.

TABLE 1

| Field Length | Field |
| --- | --- |
| 1 | Common Header Format Version<br>Bits 7:4 [Value to indicate presence of a file system area]<br>Bits 3:0 [Value to indicate format version] |
| 1 | Internal Use Area Starting Offset |
| 1 | Chassis Info Area Starting Offset |
| 1 | Board Area Starting Offset |
| 1 | Product Info Area Starting Offset |
| 1 | MultiRecord Area Starting Offset |
| 1 | PAD [If file system area is present, set to File System Area Starting Offset; if file system area not present, set to 00h] |
| 1 | Common Header Checksum |

The modified common header includes a Common Header Format Version field, an Internal Use Area Starting Offset field, a Chassis Info Area Starting Offset field, a Board Area Starting Offset field, a Product Info Area Starting Offset field, a MultiRecord Area Starting Offset field, a PAD field, and a Common Header Checksum field.

According to the particular version of the IPMI FRU Specification, the 8 bits of the Common Header Format Version field is set to a format version number, which is a value indicating a version of the IPMI FRU Specification that governs the formatting of FRU information in an FRU storage device.

In accordance with some examples of the present disclosure, the 8 bits of the Common Header Format Version field is divided into two sub-fields, where a first sub-field includes bits 0 to 3 that is set to a format version number, and a second sub-field includes bits 4 to 7 that is set to indicate whether a file system area (e.g., 112) is present in an FRU storage device. For example, bits 4 to 7 of the second sub-field set to a first value (e.g., 0 Ah or a different first value) indicates that a file system area (or multiple file system areas) is present in the FRU storage device. However, bits 4 to 7 of the second sub-field set to a second value different from the first value does not indicate that the file system area is present in the FRU storage device. Bits 4 to 7 of the second sub-field set to the second value can either (1) indicate that the file system area is not present in the FRU storage device, or (2) is indeterminate as to whether or not the file system area is present.

Although the foregoing example refers to dividing the Common Header Format Version field into sub-fields made up of specific respective bits of the Common Header Format Version field, in other examples, the Common Header Format Version field can be split in a different way.

The PAD field contains different values depending upon the value of the second sub-field (e.g., bits 4 to 7) of the Common Header Format Version field. If bits 4 to 7 of the second sub-field are set to the second value, that does not indicate the file system area is present and the PAD field can be set to a predefined pad value (e.g., 00h). On the other hand, if bits 4 to 7 of the second sub-field are set to the first value, that indicates a file system area is present and the PAD field can be set to the starting offset of the file system area in the FRU storage device.

By using bits 0 to 3 of the Common Header Format Version field to indicate a format version while bits 4 to 7 of the Common Header Format Version field are used to indicate presence of a file system area, backward compatibility can be maintained. For example, the legacy program 116 can continue to read the Common Header Format Version field to determine the format version used (the legacy program 116 uses the value set in bits 0 to 3 but would ignore the value set in bits 4 to 7 of the Common Header Format Version field).

The Internal Use Area Starting Offset field, the Chassis Info Area Starting Offset field, the Board Area Starting Offset field, the Product Info Area Starting Offset field, and the MultiRecord Area Starting Offset field contain starting offsets for respective information areas (examples of 110 in FIG. 1) that contain electronic component data consistent with the IPMI FRU Specification. Further details regarding these remaining fields of the modified common header of Table 1 are described in the IPM FRU Specification, and will not be discussed further.

Figure 2:
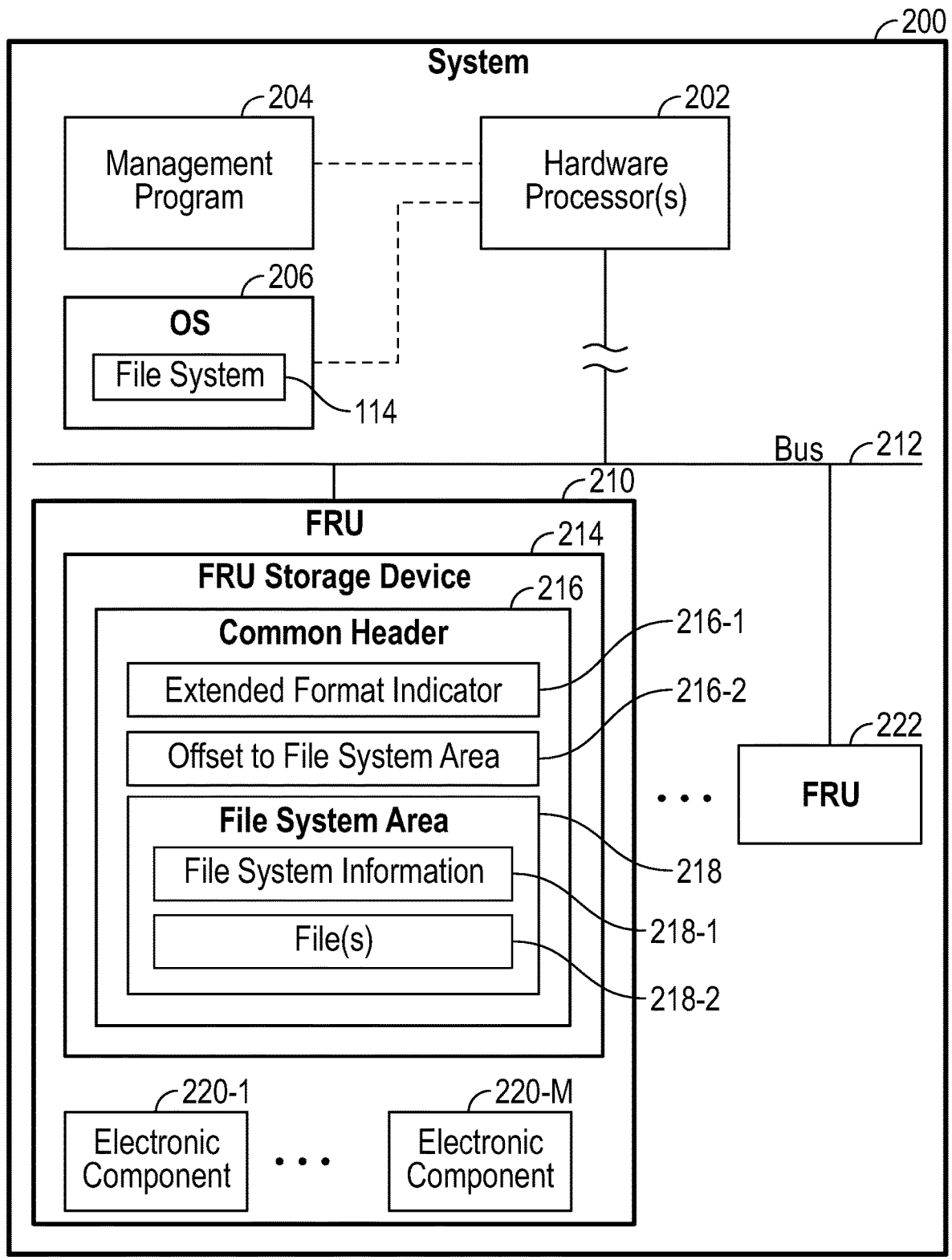

FIG. 2 is a block diagram of an example system 200 according to further implementations of the present disclosure. The system 200 includes a number of hardware processors 202. A hardware processor can include a microprocessor, a core of a multi-core microprocessor, a microcontroller, a programmable integrated circuit, a programmable gate array, or another hardware processing circuit.

Machine-readable instructions can be executed by the number of hardware processors 202. Examples of such machine-readable instructions include a management program 204 and the file system 114. The management program 204 is an example of the extended program 118 of FIG. 1. The file system 114 may be part of an OS 206 or may be separate from the OS 206. In another example, the file system 114 may be implemented by a controller in the system 200, such as a baseboard management controller (BMC) (discussed further below), or another entity in the system 200.

The machine-readable instructions including the management program 204 and the file system 114 (and the OS 206) can be stored in a storage medium (not shown) and can be loaded for execution by the number of hardware processors 202.

FIG. 2 also shows an FRU 210 connected to a bus 212 of the system 200. In some examples, the bus 212 can include a management bus that is used to perform management of the system 200. The management bus can be separate from another computer bus in the system 200 over which various devices are able to communicate data, including the number of hardware processors 202, I/O devices, memory devices, and so forth.

An FRU 210 is connected to the bus 212. The FRU 210 can be similar to the FRU 102 of FIG. 1. The FRU 210 includes an FRU storage device 214 that can store a common header 216. The common header 216 contains an extended format indicator 216-1, which is similar to the extended format indicator 108-1 of FIG. 1. The common header 216 also contains an offset 216-2 to a file system area 218 in the FRU storage device 214. The offset 216-2 to the file system area 218 can be similar to the offset 108-4 of FIG. 1, and the file system area 218 can be similar to the file system area 112 of FIG. 1.

The FRU 210 also includes electronic components to 220-1 to 220-M, where M≥1. For example, if the FRU 210 is a PCB, the electronic components to 220-1 to 220-M can be mounted to surfaces of the PCB or embedded within the PCB.

The file system area 218 contains file system information 218-1 and a number of files 218-2 that contain electronic component data relating to any or some combination of the electronic components to 220-1 to 220-M. The file system information 218-1 can be similar to the file system information 112-1, and the number of files 218-2 can be similar to files 1 to N in FIG. 1.

The number of hardware processors 202 is coupled to the bus 212, either directly or indirectly through another electronic component, such as an I/O hub. The management program 204 executed by the number of hardware processors 202 can access the FRU storage device 214 in the FRU 210. The electronic component data retrieved by the management program 204 from the FRU storage device 214 can be used to perform various management tasks, including determining an inventory of electronic components of the FRU 210, using the electronic component data to configure the FRU 210, and/or other management tasks.

The system 200 can also include an additional FRU 222 (or multiple additional FRUs) that is (are) connected to the bus 212. In some examples, the FRU 222 can also include an FRU storage device similar to the FRU storage device 104 or 214.

Figure 3:
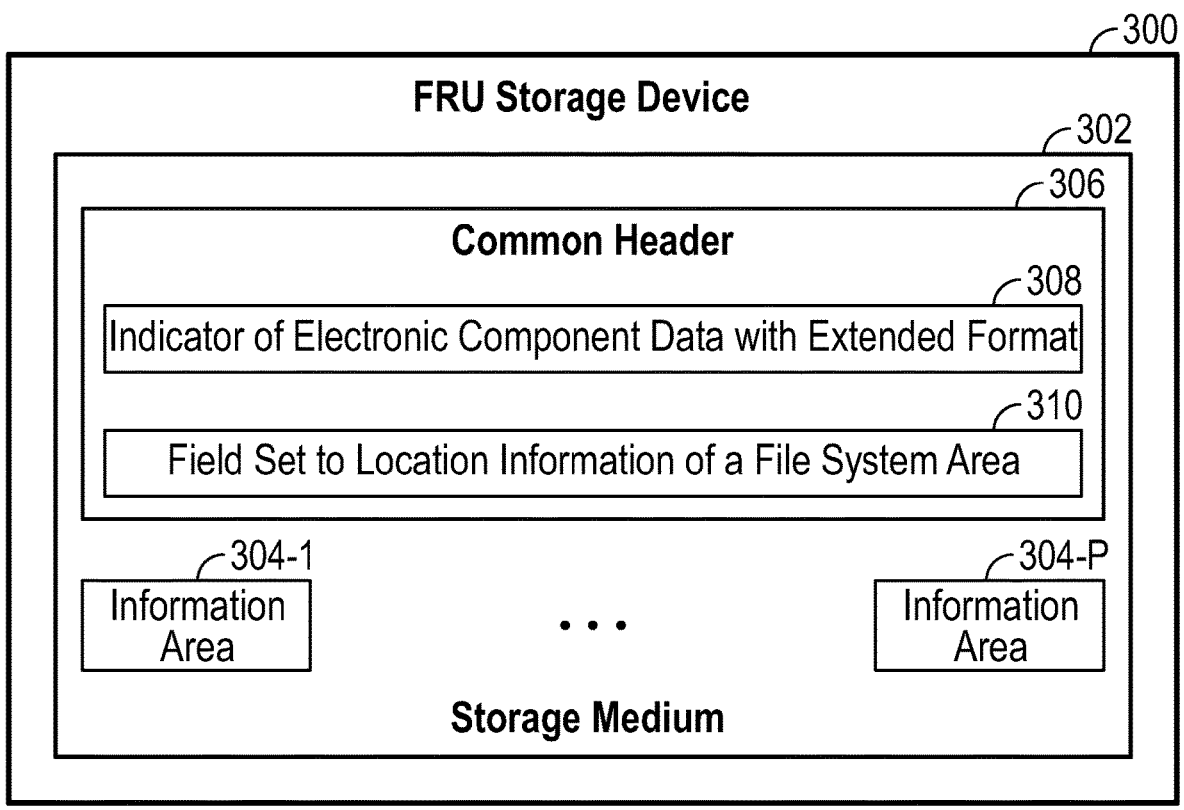
FIG. 3 is a block diagram of an FRU storage device according to some examples.

FIG. 3 is a block diagram of an FRU storage device 300 according to some examples. The FRU storage devices 104 and 214 of FIGS. 1 and 2, respectively, can be examples of the FRU storage device 300. The FRU storage device 300 includes a storage medium 302 that stores a plurality of information areas 304-1 to 304-P, where P 2.

The storage medium 302 also stores a common header 306 for the plurality of information areas 304-1 to 304-P. The common header 306 can be the common header 108 or 216 in some examples.

The common header 306 contains an indicator 308 (e.g., 108-1 or 216-1) that when set to a first value indicates presence in the FRU storage device 300 of first electronic component data according to an extended format that is different from a first format governing storage of second electronic component data in the FRU storage device 300 relating to an electronic component in an FRU. In some examples, the first format is according to a protocol that governs storage of electronic component data, and the extended format is outside of the protocol.

The common header 306 further contains a field 310 (e.g., 108-4, 216-2, or the PAD field in Table 1) set to location information (e.g., an offset) referring to a storage location of a file system area (e.g., 112 or 218) on the FRU storage device 300 when the indicator 308 is set to the first value. The file system area contains the first electronic component data according to the extended format and that relates to an electronic component in the FRU. The file system area that contains the first electronic component data can be one of the plurality of information areas 304-1 to 304-P. Another of the plurality of information areas 304-1 to 304-P can contain the second electronic component data.

The file system area is accessible by a file system using information in the file system area. For example, the file system area can include file system information (e.g., a FAT) that is used by the file system to identify areas of the storage medium 302 that contain a requested file containing electronic component data.

In some examples, the common header includes a format version field. A first portion of the format version field contains the indicator, and a second portion of the format version field contains an indicator of a version of the protocol.

In some examples, when the indicator is set to a second value different from the first value, the field (e.g., the PAD field in Table 1) is set to a predefined value (e.g., 00h).

In some examples, the indicator when set to a second value different from the first value does not indicate that the file system area is present in the FRU storage device 300.

Figure 4:
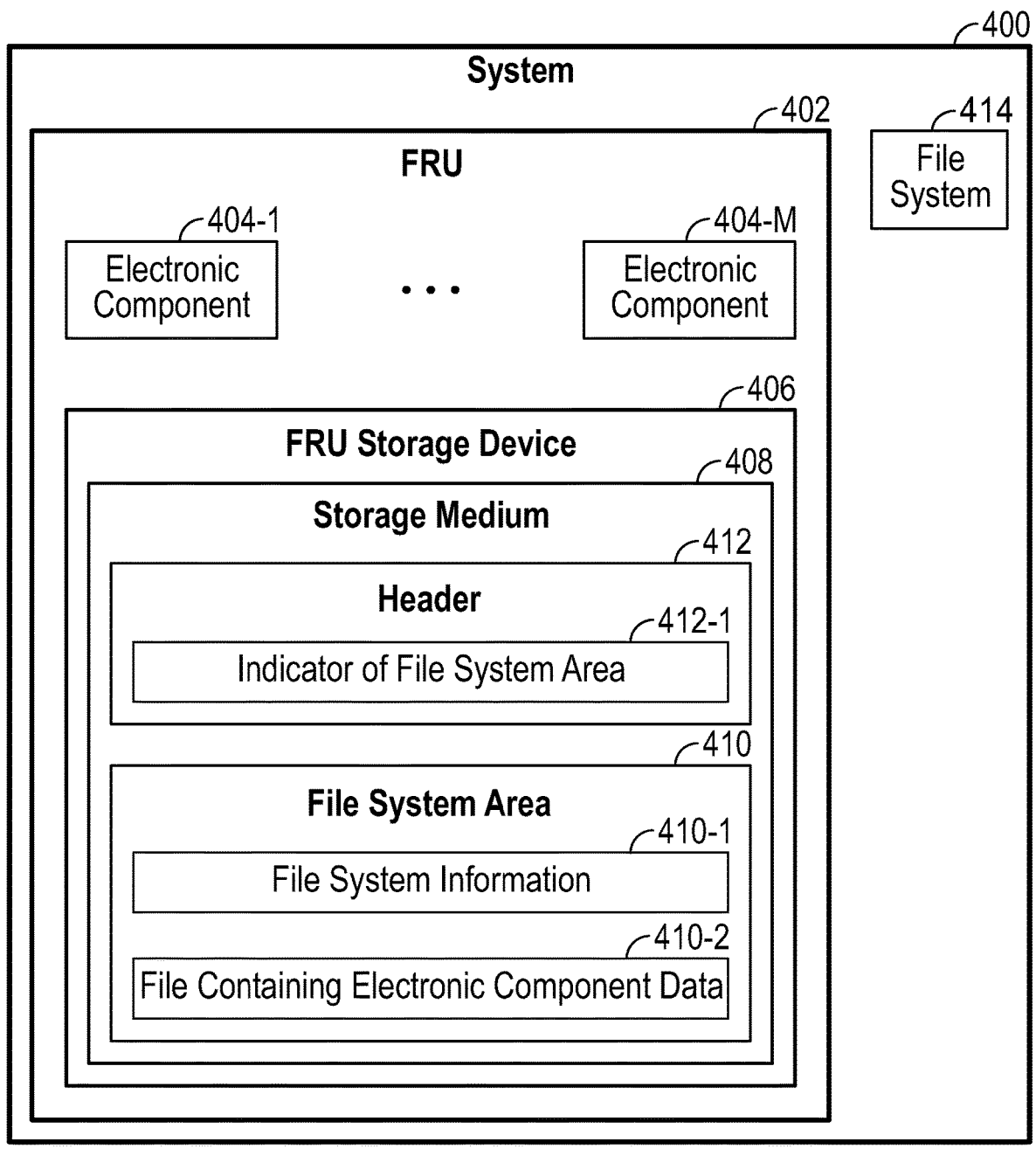
FIG. 4 is a block diagram of a system according to some examples.

FIG. 4 is a block diagram of a system 400 (e.g., the system 100 of FIG. 1 or 200 of FIG. 2). The system 400 includes an FRU 402 that has a plurality of electronic components 404-1 to 404-M. The FRU 402 further has an FRU storage device 406 that includes a storage medium 408.

The storage medium 408 stores a file system area 410, and a header 412 containing an indicator 412-1 that when set to a first value indicates presence in the FRU storage device 406 of first electronic component data in the file system area 410. The file system area 410 contains file system information 410-1 and a file 410-2 that contains the first electronic component data.

The system 400 further includes a file system 414 (e.g., 114 in FIG. 1 or 2) to access the file 410-2 that contains the first electronic component data using the file system information 410-1 in the file system area 410.

In some examples, the storage medium 408 of the FRU storage device 406 stores a plurality of information areas, which include the file system area 410 and a further information area containing second electronic component data according to a format different from a format of the first electronic component data in the file system area 410.

In some examples, the first electronic component data is according to a first format, and the second electronic component data is according to a second format, the second format consistent with a protocol that governs storage of electronic component data, and the first format being outside of the protocol.

In some examples, the header is a common header for the plurality of information areas.

Figure 5:
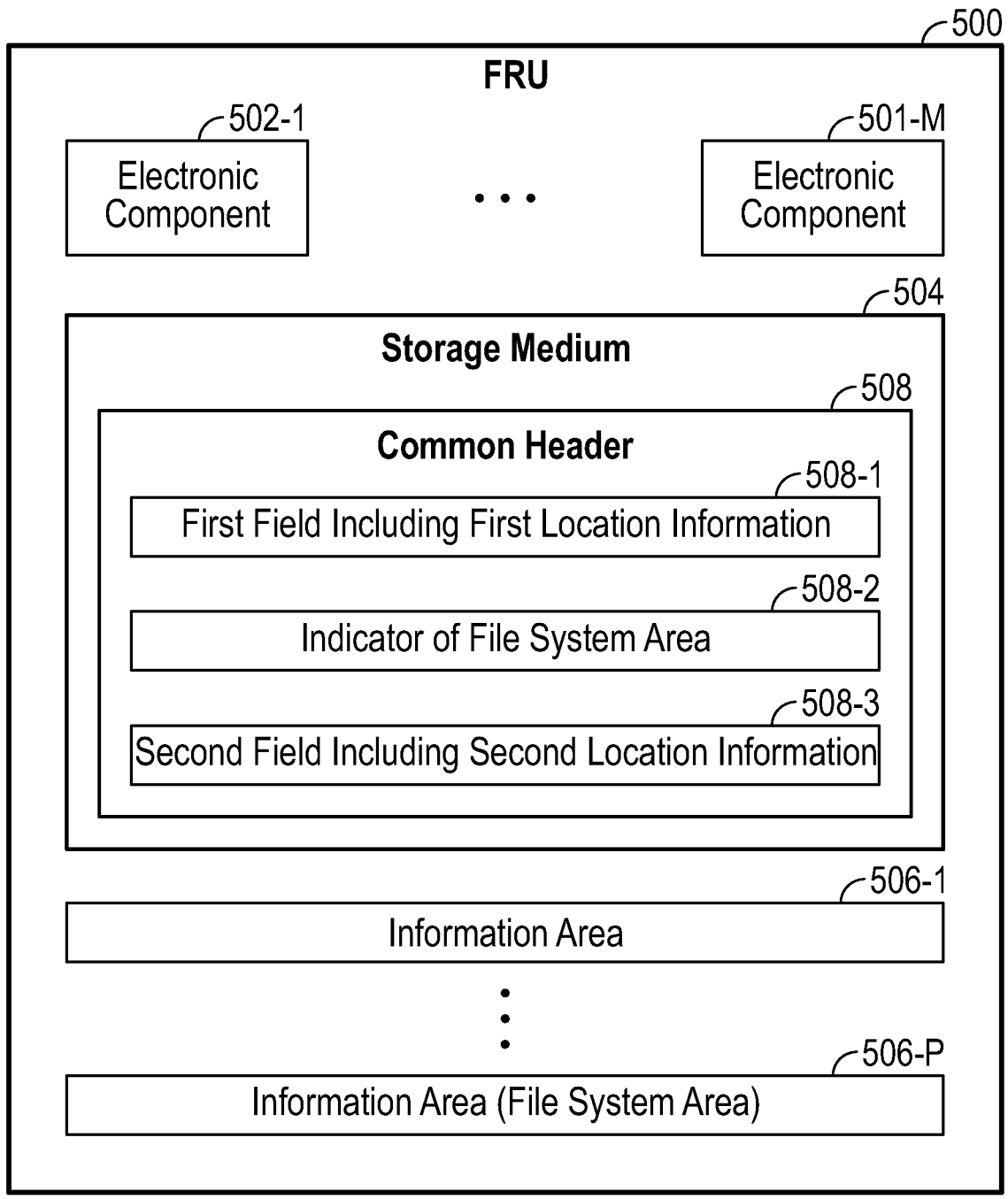
FIG. 5 is a block diagram of an FRU according to some examples.

FIG. 5 is a block diagram of an FRU 500 that includes a plurality of electronic components 502-1 to 502-M, and a storage medium 504. The storage medium 504 stores a plurality of information areas 506-1 to 506-P and a common header 508 for the plurality of information areas 506-1 to 506-P.

The common header 508 contains a first field 508-1 including first location information referring to a storage location of a first information area 506-1 of the plurality of information areas, the first information area containing first electronic component data of the first electronic component 502-1, where the first electronic component data being according to a first format.

The common header 508 contains an indicator 508-2 that when set to a first value indicates presence in the storage medium 504 of a file system area (e.g., 506-P) containing second electronic component data according to a second format that is different from the first format.

The common header 508 contains a second field 508-3 set to second location information referring to a storage location of the file system area 506-P on the storage medium 504 when the indicator is set to the first value. The second electronic component data is for a second electronic component of the plurality of electronic components 502-1 to 502-M. The file system area 506-P is accessible by a file system using file system information in the file system area.

Using techniques or mechanisms according to some implementations of the present disclosure, backward compatibility for electronic component data stored according to formats consistent with a given version of a protocol (e.g., the IPMI FRU Specification) is provided while still allowing extended formats for electronic component data stored in a file system area that can be efficiently managed using a file system. The file system area supports files of different extended formats. As an example, if the file system used to access the file system area of an FRU storage device is a FAT file system, then the different extended formats can be easily indicated using a three character extension, such as .bin (for a file that contains binary data), .jsn (for a file that contains JSON data), .rde (for a file that contains RDE-defined binary encoded JSON data, and .txt (for a file that contains raw text data. Additional extended formats for electronic component data in an FRU storage device can be supported simply by naming files with corresponding extensions.

As noted above, a file system used to access a file system area in an FRU storage device according to some examples of the present disclosure can be implemented as part of a larger component, such as an OS, a BMC, or another component.

A "BMC" can refer to a specialized service controller that monitors the physical state of an electronic system using sensors and communicates with a remote management system (that is remote from the electronic system) through an independent "out-of-band" connection. The BMC can perform management tasks to manage components of the electronic system. Examples of management tasks that can be performed by the BMC can include any or some combination of the following: power control to perform power management of the electronic system (such as to transition the electronic system between different power consumption states in response to detected events), thermal monitoring and control of the electronic system (such as to monitor temperatures of the electronic system and to control thermal management states of the electronic system), fan control of fans in the electronic system, system health monitoring based on monitoring measurement data from various sensors of the electronic system, remote access of the electronic system (to access the electronic system over a network, for example), remote reboot of the electronic system (to trigger the electronic system to reboot using a remote command), system setup and deployment of the electronic system, system security to implement security procedures in the electronic system, and so forth.

In some examples, the BMC can provide so-called "lights-out" functionality for an electronic system. The lights out functionality may allow a user, such as a systems administrator, to perform management operations on the electronic system even if an operating system (OS) is not installed or not functional on the electronic system.

Moreover, in some examples, the BMC can run on auxiliary power provided by an auxiliary power supply (e.g., a battery); as a result, the electronic system does not have to be powered on to allow the BMC to perform the BMC's operations. The auxiliary power supply is separate from a main power supply that supplies powers to other components (e.g., a main processor, a memory, an input/output (I/O) device, etc.) of the electronic system.

In some examples, in addition to the BMC in each electronic system, an additional management controller (separate from the BMCs) can be used to interact with the BMCs to perform management of the electronic systems. In examples where the electronic systems are server computers (or other types of electronic systems) mounted in a rack, the additional management controller can be referred to as a rack management controller (RMC). A "rack" refers to a mounting structure that has supports for multiple electronic systems.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A field replaceable unit (FRU) storage device comprising:
   a storage medium storing:
      a plurality of information areas comprising a file system area;
      a common header for the plurality of information areas, the common header containing:
         a format version field, wherein a first portion of the format version field comprises a first indicator that when set to a first value indicates presence in the FRU storage device of first electronic component data according to an extended format that is different from a first format of second electronic component data in the FRU storage device relating to an electronic component in an FRU, the first format being according to a protocol that governs storage of electronic component data, and wherein a second portion of the format version field comprises a second indicator of a version of the protocol; and
         a field set to location information referring to a storage location of the file system area on the FRU storage device when the first indicator is set to the first value, the file system area containing the first electronic component data according to the extended format and that relates to a first electronic component in the FRU, wherein the file system area comprises an index identifying a chain of data storage areas associated with a file containing the first electronic component data according to the extended format, and wherein the index is accessible by a file system in retrieving the file from the file system area.

2. The FRU storage device of claim 1, wherein a first information area of the plurality of information areas contains the second electronic component data according to the first format, and
   wherein the file system area of the plurality of information areas is separate from the first information area.

3. The FRU storage device of claim 1, wherein the first portion comprising the first indicator is a first sub-field of the format version field, and the second portion comprising the second indicator is a second sub-field of the format version field.

4. The FRU storage device of claim 3, wherein the format version field comprises a plurality of bits, the second sub-field is made up of lower order bits of the format version field, and the first sub-field is made up of higher order bits of the format version field.

5. The FRU storage device of claim 1, wherein the index is allocated at a time of formatting of the file system area in the storage medium of the FRU storage device.

6. The FRU storage device of claim 1, wherein the field set to the location information referring to the storage location of the file system area on the FRU storage device is an offset field distinct from the format version field.

7. The FRU storage device of claim 6, wherein when the first indicator is set to a second value different from the first value, the offset field is set to a predefined value.

8. The FRU storage device of claim 1, wherein the file is a first file, and the file system area further comprises a second file containing further electronic component data for the first electronic component or a further electronic component in the FRU.

9. The FRU storage device of claim 8, wherein the second file has a further extended format different from the extended format of the first file.

10. The FRU storage device of claim 1, wherein the common header contains fields according to an Intelligent Platform Management Interface (IPMI) Platform Management FRU Information Storage Definition protocol.

11. The FRU storage device of claim 1, wherein the common header further contains a field set to location information referring to a storage location of an information area containing the second electronic component data in the FRU storage device.

12. A system comprising:
a field replaceable unit (FRU) comprising:
a plurality of electronic components;
a field replaceable unit (FRU) storage device comprising:
a storage medium storing:
a plurality of information areas comprising a file system area, and
a common header for the plurality of information areas, the common header containing:
a format version field, wherein a first portion of the format version field comprises a first indicator that when set to a first value indicates presence in the file system area of first electronic component data according to an extended format that is different from a first format of second electronic component data in the FRU storage device relating to an electronic component in the FRU, the first format being according to a protocol that governs storage of electronic component data, and wherein a second portion of the format version field comprises a second indicator of a version of the protocol,
the file system area containing an index and a file that contains the first electronic component data, the index identifying a chain of data storage areas associated with the file containing the first electronic component data according to the extended format; and
a file system to access the file that contains the first electronic component data from the file system area using the index in the file system area.

13. The system of claim 12, wherein the plurality of information areas comprise a further information area containing the second electronic component data according to the first format different from the extended format of the first electronic component data in the file system area.

14. The system of claim 12, wherein the common header further comprises an offset field set to location information referring to a storage location of the file system area on the FRU storage device when the first indicator is set to the first value, and wherein the offset field is distinct from the format version field.

15. The system of claim 12, wherein the index is allocated at a time of formatting of the file system area in the storage medium of the FRU storage device.

16. The system of claim 12, wherein the first portion comprising the first indicator is a first sub-field of the format version field, and the second portion comprising the second indicator is a second sub-field of the format version field.

17. The system of claim 16, wherein the format version field comprises a plurality of bits, the second sub-field is made up of lower order bits of the format version field, and the first sub-field is made up of higher order bits of the format version field.

18. The system of claim 12, wherein the file system area further contains a further file that contains further electronic component data, the further file accessible by the file system, wherein the further file has a format different from the file.

19. A field replaceable unit (FRU) comprising:
a plurality of electronic components; and
a storage medium storing:
a plurality of information areas comprising a file system area;
a common header for the plurality of information areas, the common header containing:
a first offset field including first location information referring to a storage location of a first information area of the plurality of information areas, the first information area containing first electronic component data of a first electronic component of the plurality of electronic components, the first electronic component data being according to a first format that is according to a protocol that governs storage of electronic component data;
a format version field, wherein a first portion of the format version field comprises a first indicator that when set to a first value indicates presence in the storage medium of the file system area containing second electronic component data according to a second format that is different from the first format, and wherein a second portion of the format version field comprises a second indicator of a version of the protocol; and
a second offset field including second location information referring to a storage location of the file system area on the storage medium when the first indicator is set to the first value, the second electronic component data being for a second electronic component of the plurality of electronic components,
the file system area comprising an index identifying a chain of data storage areas associated with a file containing the second electronic component data according to the second format, and wherein the index is accessible by a file system in retrieving the file from the file system area.

20. The FRU of claim 19, wherein the index comprises a file allocation table (FAT) index table.

* * * * *